United States Patent
Driscoll

(10) Patent No.: US 8,908,998 B2
(45) Date of Patent: Dec. 9, 2014

(54) METHOD FOR AUTOMATED QUALITY CONTROL

(75) Inventor: Gary Driscoll, Pennington, NJ (US)

(73) Assignee: Educational Testing Service, Princeton, NJ (US)

( * ) Notice: Subject to any disclaimer, the term of this patent is extended or adjusted under 35 U.S.C. 154(b) by 1097 days.

(21) Appl. No.: 12/329,474

(22) Filed: Dec. 5, 2008

(65) Prior Publication Data

US 2009/0148075 A1 Jun. 11, 2009

Related U.S. Application Data

(60) Provisional application No. 61/012,215, filed on Dec. 7, 2007.

(51) Int. Cl.
  *G06K 9/20* (2006.01)
  *G09B 7/02* (2006.01)
  *G09B 19/00* (2006.01)

(52) U.S. Cl.
  CPC . *G09B 7/02* (2013.01); *G09B 19/00* (2013.01)
  USPC ........................................................ 382/317

(58) Field of Classification Search
  None
  See application file for complete search history.

(56) References Cited

U.S. PATENT DOCUMENTS

| | | | |
|---|---|---|---|
| 5,167,016 A * | 11/1992 | Bagley et al. ................. | 715/210 |
| 5,194,966 A | 3/1993 | Quardt et al. | |
| 6,366,759 B1 | 4/2002 | Burstein et al. | |
| 6,760,490 B1 | 7/2004 | Zlotnick | |
| 6,865,561 B1 * | 3/2005 | Allport et al. ................. | 705/406 |
| 6,937,766 B1 | 8/2005 | Wilf et al. | |
| 6,996,295 B2 | 2/2006 | Tyan et al. | |
| 7,120,318 B2 | 10/2006 | Tyan et al. | |
| 7,221,800 B2 | 5/2007 | Sesek et al. | |
| 7,286,793 B1 | 10/2007 | Miele | |
| 7,289,685 B1 | 10/2007 | Wolff et al. | |
| 7,305,129 B2 | 12/2007 | Chellapilla et al. | |
| 7,333,658 B2 | 2/2008 | Chevion et al. | |
| 7,369,701 B2 | 5/2008 | Lundberg | |
| 2003/0200077 A1 * | 10/2003 | Leacock et al. ................. | 704/1 |
| 2004/0153509 A1 | 8/2004 | Alcorn et al. | |
| 2004/0181757 A1 | 9/2004 | Brady et al. | |
| 2004/0255218 A1 * | 12/2004 | Tada et al. ..................... | 714/747 |
| 2007/0025612 A1 * | 2/2007 | Iwasaki et al. ............... | 382/154 |
| 2007/0031802 A1 * | 2/2007 | Koyama et al. ............... | 434/323 |
| 2007/0133873 A1 * | 6/2007 | Aoyagi ......................... | 382/176 |
| 2007/0211942 A1 * | 9/2007 | Curtis et al. .................. | 382/181 |
| 2007/0281734 A1 * | 12/2007 | Mizrachi ..................... | 455/550.1 |

(Continued)

OTHER PUBLICATIONS

International Search Report dated Jan. 26, 2009 from corresponding International Application No. PCT/US08/85925.

(Continued)

*Primary Examiner* — Randolph I Chu
(74) *Attorney, Agent, or Firm* — Jones Day

(57) ABSTRACT

A computer-implemented method and system for ensuring quality control over a group of test reports comprising identifying a plurality of areas within a test report that contain data elements, performing optical character recognition on the plurality of areas for each test report in the group of test reports to generate text corresponding to the content in the areas, comparing the content in the areas to corresponding data in a data file from a trusted source, and creating an output report based on the result of the comparison. The test reports may indicate educational test score results and personal identification information for test takers.

28 Claims, 4 Drawing Sheets

(56) References Cited

U.S. PATENT DOCUMENTS

2008/0063279 A1* 3/2008 Vincent et al. ............... 382/182
2008/0089586 A1* 4/2008 Igarashi et al. ............... 382/187
2009/0092320 A1* 4/2009 Berard et al. ............... 382/209

OTHER PUBLICATIONS

Written Opinion dated Jan. 26, 2009 from corresponding International Application No. PCT/US08/85925.
International Search Report of PCT Application No. PCT/US2008/085925, Jan. 26, 2009, 2 pages.

* cited by examiner

METHOD FOR AUTOMATED QUALITY CONTROL

FIELD OF THE INVENTION

This invention relates to automated verification of readable printed document content in comparison to intended printed document content, e.g. for printed educational test reports.

BACKGROUND

Testing and evaluation services, such as those services offering educational and certification testing, often provide a report to the test taker, and/or to another individual, and/or school, and/or agency, after the test has been evaluated. The report may indicate to the test taker that the test taker passed the test, or indicate a score the test taker attained on the test. This report may, for instance, relate to the test taker the number of questions the test taker got correct and the test taker's percentile ranking versus other similarly situated (e.g., in the same grade) test takers. The report may alternatively provide this same information on a per-subject basis, e.g., for critical reading, math, and writing. These tests are important to the test taker, and thus ensuring that the correct information is reflected in the test report is an important goal.

Some test services may outsource the printing of the test reports to, for instance, a third party printer. The ultimate quality of the test reports may therefore be out of the direct control of the testing service. Further, manually reviewing the test report is extremely time-consuming and subject to human error. As a result, there is a need for a way for a test service to automatically perform quality control on a large number of test reports whether the test report is produced internally or outsourced to a third party printer.

There is a further need for a way to easily configure an automated quality control system, so that the automated quality control may be quickly adapted to new test report formats.

SUMMARY

Disclosed herein is an automated method and system of ensuring quality control over a group of test reports comprising identifying a plurality of areas within a test report that contain data elements, performing optical character recognition on the plurality of areas for each test report in the group of test reports to generate text corresponding to the content in the areas, comparing the content in the areas to corresponding data in a data file from a trusted source, and creating an output report based on the result of the comparison.

BRIEF DESCRIPTION OF THE DRAWINGS

Aspects, features, benefits and advantages of the present invention will be apparent with regard to the following description and accompanying drawings, of which.

DETAILED DESCRIPTION

Figure 1:
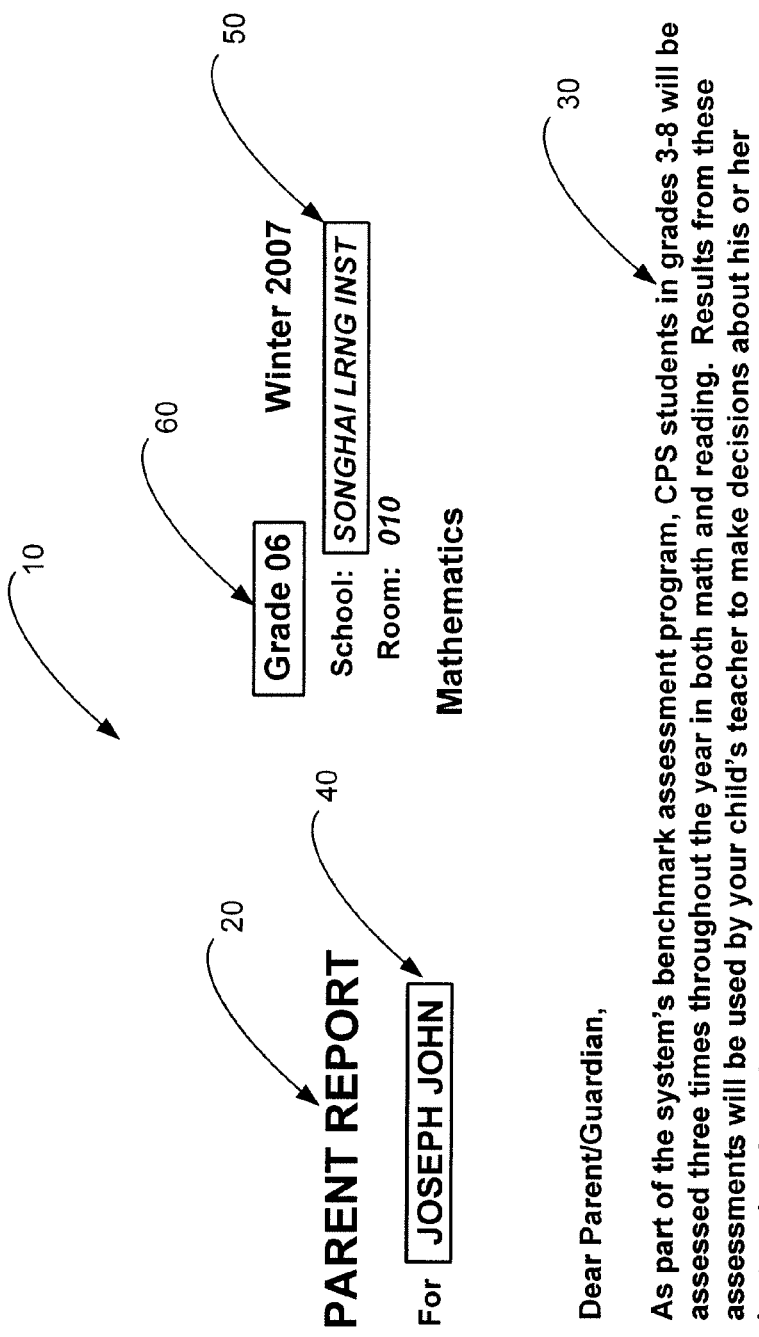
FIG. 1 is a diagram showing an exemplary test report.
Figure 2:
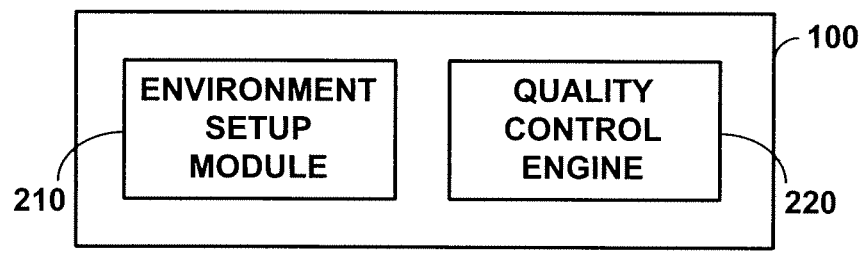
FIG. 2 is high level diagram of an automated quality control system according to a preferred embodiment.

An exemplary test report or score report 10 is illustrated in FIG. 1. Score report 10 may have static content that does not vary from test taker to test taker. For instance, score report 10 has a title 20 and form introductory paragraph 30 that do not change from test taker to test taker. However, score report 10 also contains dynamic data such as a name 40, school 50 and grade 60 that changes from test taker to test taker.

An automated quality control system 100 according to a preferred embodiment comprises an environment setup module 210 and a quality control engine 220. The environment setup module 210 may be either a standalone application installed on a local computer with a graphical user interference (GUI), or it may be a web application accessible by a network connection. The web application should preferably also provide a GUI. In a preferred embodiment, the environment setup module 210 is a web application providing a Java GUI. Alternate configurations will be evident to those skilled in the art.

Figure 3:
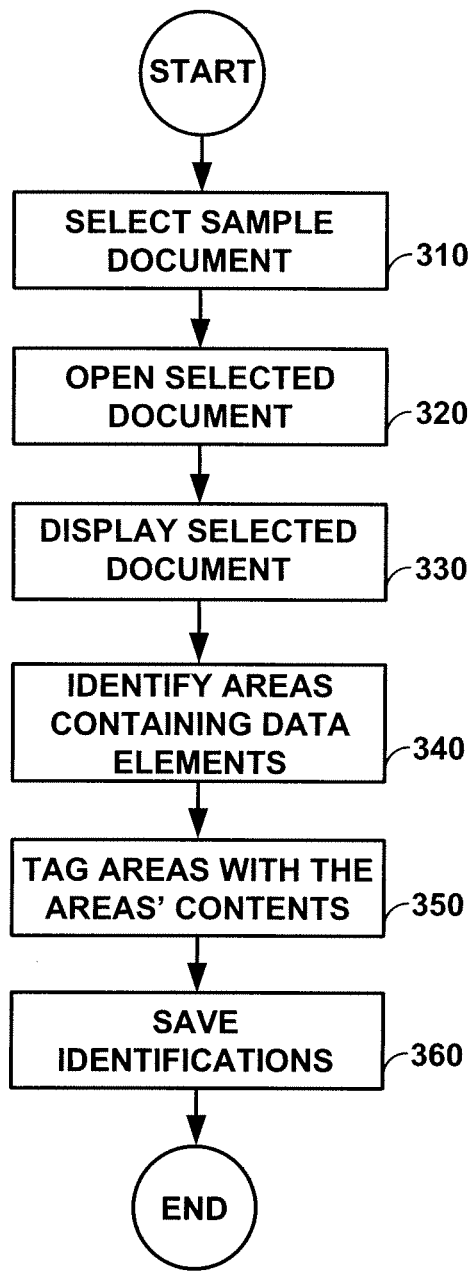
FIG. 3 is a flowchart illustrating a method of generating a configuration file according to a preferred embodiment.

The operation of an embodiment of the environment setup module 210 will be described in connection with FIG. 3. First, an administrator may select 310 a sample electronic document from the group of reports to be processed. If this document is not already in electronic form, the document may be converted into an electronic document before this step is performed. The Portable Document Format (PDF) is a preferred electronic document format. The electronic document may reside on the same computer as the environment setup module 210, or it may be accessible over a network. The environment setup module 210 preferably provides the administrator with a GUI to enable the user to select the sample electronic document. Once a sample electronic document is selected, the sample electronic document may be opened 320 by the environment setup module 210. The environment setup module 210 then displays 330 the sample electronic document to the administrator. The environment setup module 210 should provide functionality to enable the administrator to perform standard document viewing operations, such as zooming in and out, scrolling up and down and rotating the document. Once the administrator discovers data elements that need to be read from the sample electronic document and compared to the data that the testing service believes should be in sample electronic document (e.g., a name 40, school 50 and grade 60), the administrator may identify 340 those areas of the sample electronic containing the data elements. In a preferred embodiment, the administrator performs this identification by clicking on one corner of the relevant area and dragging to an opposite corner of the area, thereby forming a rectangle encompassing the area. This rectangle is preferably displayed on the GUI. The rectangle may be represented internally as a pair of coordinates representing opposite corners of the rectangle. Preferably, the administrator is able to click and drag the rectangle, and to adjust the size of the rectangle by clicking and dragging on a corner of the rectangle. For instance and with reference to FIG. 1, the administrator may identify areas for the name 40, school 50 and grade 60. The administrator may further identify what data element each area holds 350 by tagging the area with the identification of the data contained therein. For instance, name 40, school 50 and grade 60 may be tagged as "name," "school," and "grade," respectively. Those of skill in the art will appreciate that there are alternate methods of identifying and tagging areas of a document. Once the administrator indicates to the environment setup module 210 that the identification of areas containing data elements is complete, the environment setup module 210 may save 360 these identifications for later use. These identifications may be saved to, for instance, a configuration file. In a preferred embodiment, these identifications are saved in an Extensible Markup Language (XML) file.

Figure 4:
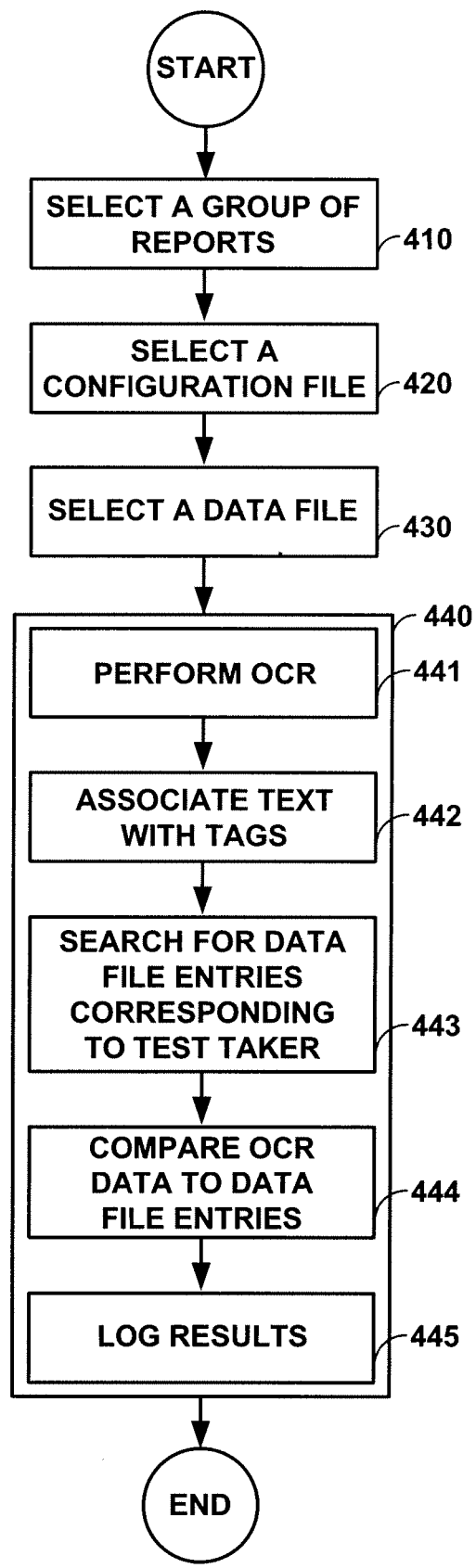
FIG. 4 is a flowchart illustrating a method of analyzing the accuracy of a group of test reports according to a preferred embodiment.

The operation of an embodiment of the quality control engine 220 will be described with reference to FIG. 4. An administrator first selects 410 a group of reports upon which to perform quality control. These reports may be located on the same computer as the quality control engine 220, or may be located remotely and accessible over a network. A testing service may receive answer sheets from a large number test-takers. The testing service may grade these answer sheets in a largely automated fashion, resulting in an electronic representation of the test results for the test takers. The testing service may then have individualized reports printed based on the test results. The testing service may either send the electronic representation to a third party for printing, or may print the reports itself. These reports may then be scanned into an electronic format, preferably PDF. An administrator also may select 420 a configuration file, preferably created according to the above-described method. As discussed above, the configuration file identifies areas on a report containing data elements. Finally, an administrator may select 430 a data file. The data file may contain individualized data for each test taker such as, for instance, a name 40, school 50 and grade 60. In a preferred embodiment, at least one piece of individualized data is unique to the test taker, such as a test registration number or other unique identifier.

Once a group of reports, configuration file, and data file have been selected (the order of selection of these components is not significant), the group of reports is analyzed 440. During the analysis, the quality control engine 220 may iterate through the reports in the group of reports. The quality control engine 220 may first, for each report in the group of reports, perform optical character recognition (OCR) 441 on the areas identified in the configuration file, thereby recovering the text lying within the identified areas. This step is only required if paper reports are being scanned. In alternate embodiments, electronic documents, such as pdfs, may be used. In such cases, the text lying within the identified area will may already be in the electronic document, and therefore OCR is not required. The quality control engine 220 may then associate 442 the text lying within the identified areas with the corresponding tags from the configuration file. Preferably the text in one of the identified areas uniquely identifies the test taker. For instance and referring to FIG. 1, "JOSEPH JOHN" may be associated with the tag "name," "Grade 06" may be associated with the tag "grade," and "SONGHAI LRNG INST" may be associated with the tag "school." The name "JOSEPH JOHN" may uniquely identify the test taker. The quality control engine 220 may then search 443 through the data file for entries in the data file corresponding to the test taker. For instance, the quality control engine 220 may search for all entries associated with the name "JOSEPH JOHN." The quality control engine 220 may then compare 444 the entries in the data file to the corresponding entries OCRed from the report. For instance, the quality control engine 220 may compare "Grade 06" to the entry for the tag "grade" corresponding to "JOSEPH JOHN." Based on the result of the comparisons, the quality control engine 220 may indicate 445 the result of the comparisons in a log file, or through a graphical user interface. In a preferred embodiment, if the OCRed value differs from the expected value in a report, the quality control engine 220 will provide a graphical user interface displaying the report, highlighting the OCRed value that differs from the expected value, and displaying the expected value. The testing service may then have the erroneous reports recreated.

CONCLUSION

While the particular METHOD FOR AUTOMATED QUALITY CONTROL as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular means "at least one", not "only one", unless otherwise stated in the claim.

All structural and functional equivalents to the elements of the above-described preferred embodiment that are known or later come to be known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. §112, sixth paragraph, unless the element is expressly recited using the phrase "means for" or, in the case of a method claim, the element is recited as a "step" instead of an "act".

All publications mentioned herein are incorporated by reference in their entireties. Nothing herein is to be construed as an admission that the embodiments described herein are not entitled to antedate such disclosure by virtue of prior invention. As used herein, the term "comprising" means "including, but not limited to."

The invention is a general purpose computer programmed according to the inventive steps herein. The invention can also be embodied as an article of manufacture—a machine component—that is used by a digital processing apparatus and which tangibly embodies a program of instructions that are executable by the digital processing apparatus to undertake the present invention. This invention is realized in a critical machine component that causes a digital processing apparatus to perform the inventive method steps herein. The invention is also a computer-implemented method for undertaking the acts disclosed.

What is claimed is:

1. A computer-implemented method of ensuring quality control of a printed document, comprising:
    acquiring, using a processing system, an electronic image of the printed document;
    identifying, using the processing system, an identifier data field on the electronic image, the identifier data field being a first area of the electronic image that includes text that is configured to associate the printed document with a particular person, wherein the particular person is associated with intended text from a trusted source;
    identifying, using the processing system, a content data field on the electronic image, the content data field being a second area of the electronic image that includes text;
    saving a document configuration to a file, wherein the document configuration includes locations of the identifier data field and the content data field on the electronic image and a type of data for each of the identifier data field and the content data field;
    acquiring, using the processing system, identifier text and content text from the electronic image by performing optical character recognition on the identifier data field and on the content data field, respectively, wherein the identifier text and the content text are acquired based on the locations of the identifier data field and the content data field;

accessing, using the processing system, the intended text from the trusted source based on the identifier text;

comparing, using the processing system, the content text to the intended text, wherein the comparing is configured to determine whether the printed document includes the intended text, and wherein the comparing is based on the type of data for the identifier data field and the type of data for the content data field; and outputting, using the processing system, indicia of results of the comparison.

2. The method of claim 1 wherein the electronic image is of an educational test score report.

3. The method of claim 1 wherein the text included in the content data field does not vary between documents.

4. The method of claim 1 wherein the text included in the content data field varies between documents.

5. The method of claim 1 wherein the acquiring comprises scanning the printed document.

6. The method of claim 1 wherein a user identifies the content data field via a graphical user interface.

7. The method of claim 1 wherein the content data field is tagged to denote the type of data included at the content data field.

8. The method of claim 1 wherein the indicia are saved to a log file.

9. The method of claim 1 wherein corrective actions are selectively taken when the comparing detects a content discrepancy between the content text and the intended text.

10. A computer system for ensuring quality control of a printed document, comprising:

one or more processors;

one or more non-transitory computer-readable storage mediums containing instructions configured to cause the one or more processors to perform operations including:

acquiring an electronic image of the printed document;

identifying an identifier data field on the electronic image, the identifier data field being a first area of the electronic image that includes text that is configured to associate the printed document with a particular person, wherein the particular person is associated with intended text from a trusted source;

identifying a content data field on the electronic image, the content data field being a second area of the electronic image that includes text;

saving a document configuration to a file, wherein the document configuration includes locations of the identifier data field and the content data field on the electronic image and a type of data for each of the identifier data field and the content data field;

acquiring identifier text and content text from the electronic image by performing optical character recognition on the identifier data field and on the content data field, respectively, wherein the identifier text and the content text are acquired based on the locations of the identifier data field and the content data field;

accessing the intended text from the trusted source based on the identifier text;

comparing the content text to the intended text, wherein the comparing is configured to determine whether the printed document includes the intended text, and wherein the comparing is based on the type of data for the identifier data field and the type of data for the content data field; and outputting indicia of results of the comparison.

11. The system of claim 10 wherein the electronic image is of an educational test score report.

12. The system of claim 10 wherein the text included in the content data field does not vary between documents.

13. The system of claim 10 wherein the text included in the content data field varies between documents.

14. The system of claim 10 wherein the acquiring comprises scanning the printed document.

15. The system of claim 10 wherein a user identifies the content data field via a graphical user interface.

16. The system of claim 10 wherein the content data field is tagged to denote the type of data included at the content data field.

17. The system of claim 10 wherein the indicia are saved to a log file.

18. The system of claim 10 wherein the instructions are configured to cause the one or more processors to selectively take corrective actions when the comparing detects a content discrepancy between the content text and the intended text.

19. A non-transitory computer program product for ensuring quality control of a printed document, tangibly embodied in a machine-readable non-transitory storage medium, including instructions configured to cause a data processing system to:

acquire an electronic image of the printed document;

identify an identifier data field on the electronic image, the identifier data field being a first area of the electronic image that includes text that is configured to associate the printed document with a particular person, wherein the particular person is associated with intended text from a trusted source;

identify a content data field on the electronic image, the content data field being a second area of the electronic image that includes text;

save a document configuration to a file, wherein the document configuration includes locations of the identifier data field and the content data field on the electronic image and a type of data for each of the identifier data field and the content data field;

acquire identifier text and content text from the electronic image by performing optical character recognition on the identifier data field and on the content data field, respectively, wherein the identifier text and the content text are acquired based on the locations of the identifier data field and the content data field;

access the intended text from the trusted source based on the identifier text;

compare the content text to the intended text, wherein the comparing is configured to determine whether the printed document includes the intended text, and wherein the comparing is based on the type of data for the identifier data field and the type of data for the content data field; and output indicia of results of the comparison.

20. The non-transitory computer program product of claim 19 wherein the electronic image is of an educational test score report.

21. The non-transitory computer program product of claim 19 wherein the text included in the content data field does not vary between documents.

22. The non-transitory computer program product of claim 19 wherein the text included in the content data field varies between documents.

23. The non-transitory computer program product of claim 19 wherein the acquiring comprises scanning the printed document.

24. The non-transitory computer program product of claim 19 wherein a user identifies the content data field via a graphical user interface.

25. The non-transitory computer program product of claim 19 wherein the content data field is tagged to denote the type of data included at the content data field.

26. The non-transitory computer program product of claim 19 wherein the indicia are saved to a log file.

27. The non-transitory computer program product of claim 19 wherein the instructions are configured to cause the data processing system to selectively take corrective actions when the comparing detects a content discrepancy between the content text and the intended text.

28. A computer-implemented method of ensuring quality control for a group of printed documents, the method comprising:

acquiring, using a processing system, an electronic image of each printed document of the group of printed documents, the printed documents having a format that causes particular types of data to appear at same locations on each of the printed documents;

selecting, using the processing system, a configuration file associated with the format;

determining from the configuration file (i) locations of an identifier data field and a content data field on the electronic images, and (ii) a type of data included at each of the locations, using the processing system; and performing a batch processing procedure on the acquired electronic images using the determined locations and the determined types of data, the batch processing procedure including, for each electronic image of the acquired electronic images:

identifying, using the processing system, the identifier data field on the electronic image, the identifier data field being a first area of the electronic image that includes text that is configured to associate the electronic image with a particular person, wherein the particular person is associated with intended text from a trusted source;

identifying, using the processing system, the content data field on the electronic image, the content data field being a second area of the electronic image that includes text;

acquiring, using the processing system, identifier text and content text from the electronic image by performing optical character recognition on the identifier data field and on the content data field, respectively;

accessing, using the processing system, the intended text from the trusted source based on the identifier text;

comparing, using the processing system, the content text to the intended text, wherein the comparing is configured to determine whether a printed document includes the intended text, the printed document being the printed document of the group of printed documents from which the electronic image was acquired; and outputting, using the processing system, indicia of results of the comparison.

\* \* \* \* \*

UNITED STATES PATENT AND TRADEMARK OFFICE
CERTIFICATE OF CORRECTION

PATENT NO. : 8,908,998 B2  
APPLICATION NO. : 12/329474  
DATED : December 9, 2014  
INVENTOR(S) : Gary Driscoll et al.

Page 1 of 1

It is certified that error appears in the above-identified patent and that said Letters Patent is hereby corrected as shown below:

Title Page, item (75), Inventor(s) should read: Gary Driscoll, Pennington, NJ (US); K. Ron Jacob, Branchburg, NJ (US); Gerald Hofmann, Langhorne, PA (US)

Signed and Sealed this  
Second Day of June, 2015

Michelle K. Lee  
*Director of the United States Patent and Trademark Office*